Oct. 5, 1971  KENJI HIRUMA  3,610,124
FLASH CAMERA WITH ASSOCIATED APERTURE AND FOCUS SETTINGS
Filed Feb. 24, 1969
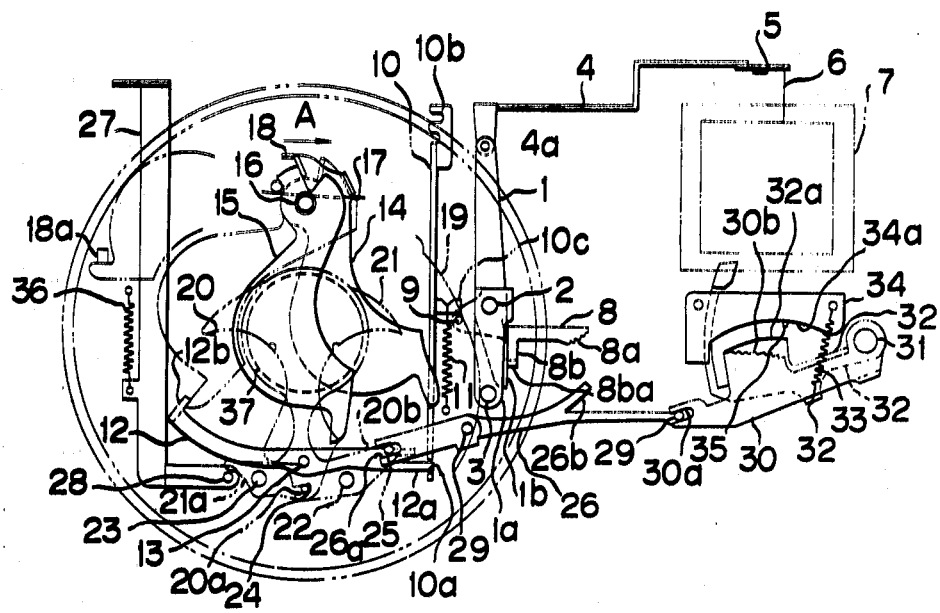
INVENTOR
KENJI HIRUMA
BY *Burgess, Ryan + Hicks*
ATTORNEYS United States Patent Office 3,610,124
Patented Oct. 5, 1971

3,610,124
FLASH CAMERA WITH ASSOCIATED APERTURE AND FOCUS SETTINGS
Kenji Hiruma, Tokyo, Japan, assignor to Kabushiki Kaisha Ricoh, Tokyo, Japan
Filed Feb. 24, 1969, Ser. No. 801,380
Claims priority, application Japan, Feb. 29, 1968, 43/13,075
Int. Cl. G03b 9/25
U.S. Cl. 95—11.5                    3 Claims

ABSTRACT OF THE DISCLOSURE

A flash camera having a barrel lens and distance adjustment means including a rangefinder and also having aperture setting means. Rotation of the barrel lens rotates a cam that operates both the distance adjustment means and the aperture setting when a flash bulb is inserted in the camera.

BACKGROUND OF THE INVENTION

The present invention relates to an auto-flash device for a camera and more particularly an auto-flash device in which a focused zone (or depth of field) indication cam or rangefinder interlocking cam is used in common with an aperture setting cam for flash photography.

In case of flash photography, the shutter speed must be varied accordingly and the aperture must be also adjusted in response to the distance. Known is the so-called auto-flash device in which an aperture is adjusted in response to the distance by a cam means disposed in the focusing mechanism. In the known mechanism the cam for focusing is provided independently of the cam for aperture setting or adjustment so that the mechanism is complicated and adjustment errors and malfunction tend to occur. Furthermore, the cost is high.

In view of the above, the present invention has for its object to provide an auto-flash device in which a focused zone (or depth-of-field) indication cam or rangefinder interlocking cam is used in common with an aperture setting or adjustment cam for flash photography, thus eliminating the defects encountered in the prior art.

SUMMARY OF THE INVENTION

In brief, according to the present invention, the auto-flash device includes cam means operatively associated with distant adjustment means of a camera; focused zone (or depth of field) indicating means or rangefinder interlocking means operatively interlocked with the actuation of said cam means, aperture adjustment means directly or indirectly coupled operatively to said cam means, and means for setting or adjusting the aperture which permits the engagement of said aperture setting or adjusting means with aperture blade driving means when a flash-cube is attached to the camera.

According to one embodiment of the present invention, said focused zone (or depth of field) indicating means or said rangefinder interlocking means comprises a lever mechanism one member of which engages with said cam means for rotation.

According to the embodiment of the present invention, said aperture setting or adjusting means comprises a sawtooth-shaped cam pivoted to said lever mechanism in such a manner that said sawtooth-shaped cam is in engagement with a flash-sync lever but not in engagement with said aperture driving means when a flash-cube is not attached upon the camera while said sawtooth-shaped cam is released from the engagement with said flash-sync lever and is adapted to move together with said lever mechanism upon attachment of the flash-cube upon the camera for engagement with said aperture blade driving means so as to set or adjust the aperture.

The aperture driving means is actuated by an aperture setting or adjusting mechanism used in ordinary photography, that is when no flash-cube is used.

The above objects, advantages and features of the present invention will become apparent from the following description taken in conjunction with the accompanying drawing.

BRIEF DESCRIPTION OF DRAWING

The single figure is a plan view illustrating the essential parts of one preferred embodiment of an auto-flash device according to the present invention.

DESCRIPTION OF THE PREFERRED EMBODIMENT

A lever 1 which is connected to a rangefinder and will be referred to as "range lever" hereinafter is rotatably pivoted to a camera main body by means of a pivot 2 and is imparted by means of a spring not shown with a tendency of rotating in the clockwise direction. The lower end portion of the range lever 1 is bifurcated so as to provide a front arm 1a and rear arm 1b. At the free end of the front arm 1a is fixedly secured a pin 3. The upper end of the range lever 1 is pivoted to the lower end of the left arm 4a of a sliding lever 4 which is pivoted to the camera body for traverse slidable movement. The right end of the sliding lever 4 is engaged with a zone focus or depth-of-field pointer lever 5. Upon traverse motion of the sliding lever 4, the pointer 6 attached to the zone focus pointer lever 5 is moved so as to indicate the focused zone or depth of field. An aperture control lever 8 is rotatably pivoted by means of the pivot 2 in common with the range lever 1. The aperture control lever 8 has a tendency of rotating in the clockwise direction by means of a spring not shown, and has at one end thereof a pin 9 and a sawtooth-shaped cam 8a formed at the other end thereof. A projection 8b is extended downwardly from the center portion of the lever 8 and has a bent portion 8ba formed at the lower end thereof. This bent portion 8ba is normally engaged with the rear arm 1b of the lever 1. A flash-sync lever 10 is attached to the camera body for vertical slidable motion by a predetermined distance. The flash-sync lever 10 has a slot 10a formed at the lower end thereof, a bent portion 10b formed at the upper end thereof and an intermediate bent portion 10c at the center portion thereof. The lower side edge of the intermediate bent portion 10c is in engagement with the pin 9 of the aperture control lever 8. A spring 11 is loaded between the bent portion 10c and the camera body so as to normally bias the flash-sync lever 10 downwardly. The upper bent portion 10b is associated with a means not shown so that when the flash-cube is attached to the camera, the upper bent portion 10b, that is the flash-sync lever 10 is caused to move upwardly. An engaging lever 12 is rotatably pivoted to the camera body by means of a pivot 13, and one end 12a of the engaging lever 12 fits loosely into the slot 10a of the flash-sync lever 10 while the other end of the engaging lever is formed as bent portion or engaging end 12b. Normally this engaging end 12b extends into the paths of rotation of driving and driven shutter blades 14 and 15 so as to engage with them and stop their rotation caused upon release of the shutter. However, when the flash-cube is attached to the camera, the engaging end 12b is adapted to be withdrawn out of the paths because the flash-sync lever 10 is moved upwardly by the means not shown as described above. Both of the driving and driven shutter blades 14 and 15 are rotatably pivoted to the shutter base plate by a common pivot 16 and the driving blade 14 is imparted with a tendency of normally rotating in the counterclockwise direction by means of the force of a spring 17. When upon release of the shutter a driving lever 18 is moved in the direction indicated by the arrow A by a means not shown, the driving blade 14 is also rotated in the clockwise direction so that one portion of the driving blade 14 engages with a portion of the driven blade 15, whereby both of the blades in the overlapped state are rotated until they are stopped by the engaging end 12b of the engaging lever 12 when end 12b extends into their paths as described hereinabove. Thereafter, the blades are returned to their initial positions by the force of the spring 17, thereby completing one exposure. On the other hand, when the engaging end 12b is not protruded into the paths, both of the blades 14 and 15 are permitted to rotate through a predetermined maximum angle of rotation, that is until they are stopped by a stop pin 18a located at the end of the rotation through the maximum angle. Thereafter, the blades are returned to their initial positions in the similar manner as described above, thus completing one exposure.

When a flash-cube is attached and when the blades are permitted to rotate through the maximum angle as described above, the exposure time is as long as needed for flash photography. On the other hand, when the flash-cube is not attached, the exposure time is shorter and therefore is suited for ordinary photography.

A cam 19 is attached to the lens barrel not shown and a distance or range ring (not shown) rotatably attached upon the camera is rotated so as to advance the lens barrel together with the cam 19, thereby focusing the subject. The pin of the range lever 1 is engaged with the cam 19 so that the range lever 1 is rotated in the clockwise direction as the lens is adjusted from its infinity position toward the shorter range position thereby indicating within a rangefinder 7 the focused zone by the pointer 6 through the sliding lever 4.

Aperture blades 20 and 21 are rotatably pivoted by pivots 22 and 23 respectively to the camera body so as to be symmetrically located. Into a slot 20a formed in the aperture blade 20 between the pivots 22 and 23 is loosely fitted a pin 24 extending from the aperture blade 21. Into a slot 26a formed at one end of a coupling lever 26 is loosely fitted a pin extended from a lower projection 20b of the aperture blade 20. A lower projection 21a of the aperture blade 21 has its lower side edge engaged with a pin 28 fixed to the lower end of a shutter release lever 27. A spring (not shown) is attached to the aperture blade 21 so as to impart thereto the tendency of rotating in the counterclockwise direction while imparting to the aperture blade 20 the tendency of rotating in the clockwise direction. That is, both of the aperture blades 20 and 21 have imparted thereto the tendency to normally open the aperture of the lens by the spring.

An upwardly directed branched or bifurcated arm extends from the arm opposite to the arm having the slot 26a of the coupling lever 26. At the other end of the coupling lever 26 is fixed a pin 29 which is loosely fitted into a slot 30a formed at the free end of a pointer clamping lever 30. This lever 30 and an auxiliary pointer clamping lever 32 are pivoted to the camera body by a common pivot 31. A pointer clamping cam 30b is formed in the pointer clamping lever 30 while an auxiliary pointer clamping cam 32a is formed on the auxiliary pointer clamping lever 32. A spring 33 is attached to the lever 32 so as to normally rotate in the clockwise direction both of the levers 32 and 30 in engagement therewith. A pointer clamping plate 34 is fixed to the camera body and an exposure meter (not shown) is so placed that a pointer 35 thereof may move adjacent to the pointer clamping side 34a of the plate 34. The release coupling lever 27 is attached to the camera body for vertical sliding movement within a predetermined distance and is normally biased upwardly by means of the spring 36. Reference numeral 37 designates the maximum aperture.

Next the mode of operation of the invention will be described. In case of ordinary photography (without a flash bulb), upon depressing the shutter release button, the relase lever 27 moves downwardly so that the aperture blades 20 and 21 are rotated in the clockwise and counterclockwise directions respectively and the coupling lever 26 is rotated in the counterclockwise direction by the aperture blade 20. Consequently, the pointer clamping lever 30 as well as the auxiliary lever 32 are caused to rotate in the clockwise direction so that the pointer 35 is clamped between the auxiliary lever 32 and the pointer clamping plate 34. Thereafter, the pointer clamping lever 30 clamps the pointer 35 by the pointer clamping cam 30b and the angle of rotation of the pointer clamping lever 30 is determined by the angle of rotation of the pointer 35. In this case, the aperture blades 20 and 21 form an optimum aperture depending upon the brightness of the subject. Next the driving lever 18 rotates in the direction indicated by the arrow A, thereby rotating the driving shutter blade 14, whereby the exposure is completed. In this case, the driving and driven shutter blades 14 and 15 are permitted to rotate until they engage with the engaging end 12b of the engaging lever 12. Thereafter, when the depression of the release button is released, the release lever 27 is moved upwardly, all of the aperture blades 20 and 21, the coupling lever 26, the pointer control lever 30 and the auxiliary lever 32 are returned to their initial positions so that the aperture is closed, whereby the pointer 35 is released and prepared for the next photography.

In case of ordinary photography, when the coupling lever 26 rotates through the maximum angle in the counterclockwise direction, that is when the brightness of the subject is low so that the pointer control lever 30 rotates through its maximum angle of rotation, thereby opening the aperture blades 20 and 21 to their full extent, the leading end of the branched or bifurcated arm 26a of the coupling lever 26 will not be permitted to engage with the sawtooth-shaped cam 8a of the control lever 8. This is true even when the cam 19 is rotated to the shorter range position so that the range lever 1 is rotated in the clockwise direction because the aperture control lever 8 remains stationary because of the flash-sync lever 10.

Next the mode of operation of the present invention in case of flash photography will be described hereinafter. When a flash-cube is attached to the camera, the flash-sync lever 10 is caused to move upwardly by the means not shown so that the aperture control lever 8 is released whereby the lever 1 is permitted to rotate with its rear arm 1b in engagement with the projection 8b of the control lever 8. Concurrently, the engaging lever 12 is rotated in the counterclockwise direction so that the engaging end 12b is moved away from the paths of the driving and driven shutter blades 14 and 15 thereby setting the shutter mechanism to one of the slow shutter speeds. When the lens is rotated together with the cam 19 so as to focus the subject, the range lever 1 is rotated in the clockwise direction as the lens is adjusted from its infinity position to the shorter range so that the aperture control lever 8 is rotated in the clockwise direction and the sawtooth-shaped cam 8a is moved downwardly and stopped at a position corresponding to the focusing range or distance. In this case, the pointer 6 through the sliding lever 4, simultaneously indicates the focused zone. (The operation is reverse when the lens is adjusted from the shorter range toward infinity.) Next upon depressing the shutter release button, the aperture blades 20 and 21 are caused to rotate in the clockwise and counterclockwise directions respectively and the coupling lever 26 is rotated in the counterclockwise direction. Rotation of the lever 26 is stopped when the leading end of the branched or bifurcated arm 26b engages with the sawtooth-shaped cam 8a of the aperture control lever which is moved downwardly to a position corresponding to the focusing range as described above. Therefore, the aperture blades 20 and 21 form an aperture corresponding to the focusing distance. In this case, however, because of the low brightness of the subject, the actuation of the shutter blades 20 and 21 will not be prevented by the lever 30 which clamps the pointer 35. Next the driving lever 18 is moved in the direction indicated by the arrow A so as to drive the driving blade 14 so that the driving and driven shutter blades 14 and 15 are permitted to rotate until they are stopped by the pin 18a and then returned to their initial positions, thereby allowing one exposure operation. Upon release of the depression of the shutter release button, the release lever 27 moves upwardly so that all of the aperture blades 20 and 21, the coupling lever 26, the pointer clamping lever 30 and the auxiliary lever 32 are returned to their initial positions respectively in the similar manner as described above. However, the aperture control lever 8 remains unchanged unless the lens or the cam 19 is rotated. Thereafter, the film is advanced by the film winding lever not shown and concurrently the driving lever 18 is returned to its initial position by a means not shown so that the shutter mechanism is charged while the flashcube is rotated through 90° for the next flash photography.

In the above embodiment, in case of flash photography the cam 19 controls the range lever 1 and the aperture control lever 8 through the range lever 1 for control of both of the focus zone indication and the aperture. For example, when the range lever 1 is interconnected to a split-field rangefinder and when the configurations of the cam 19 and the sawtooth-shaped cam 8a are suitably determined, the device of the present invention can be interlocked with the rangefinder. In this case, the aperture is of course adjusted in response to the focusing distance upon flash photography by the cam 19.

As described hereinabove, according to the present invention, a cam for focused zone or depth-of-field indication or a cam for distance indication can be employed in common with an aperture adjustment cam so that the aperture adjustment in response to the distance upon flash photography becomes very accurate and easier. Thus, the auto-flash mechanism can be made compact in size with resultant increased operation accuracy and reliability.

So far the present invention has been described in particular reference to the preferred embodiment thereof, but it will be understood that the variations and modifications can be effected without departing the true spirit of the present invention as described hereinafter and as defined in the appended claims.

What is claimed is:

1. A flash camera having a rotatable lens barrel for focus comprising:
   distance adjusting means;
   cam means connected to said lens barrel for rotation therewith, said cam means engageable with said distance adjustment means;
   aperture setting means having an aperture control lever and an aperture coupling lever;
   said aperture coupling lever rotatable to set the aperture opening of the camera;
   a flash lever having a first position when no flash bulb is inserted in the camera, said flash lever in said first position normally engaging said aperture control lever to hold said control lever in a first predetermined position out of rotative contact with said aperture coupling lever;
   said flash lever movable to a second position when a flash bulb is inserted in the camera, said flash lever in said second position being disengaged from said aperture control lever; and
   said aperture control lever being rotatable by said cam means in said disengaged condition to a second predetermined position for determining a limiting movement of said aperture coupling lever.

2. A flash camera according to claim 1 in which said aperture control lever comprises an arm having a sawtooth shape on its end contactable by said aperture control lever in the limiting position.

3. A flash camera according to claim 2 in which said aperture coupling lever comprises a bifurcated arm, one branch of which is adapted to contact said sawtooth end and the other branch being connectible to aperture indicating means.

References Cited

UNITED STATES PATENTS

| | | | |
|---|---|---|---|
| 3,174,416 | 3/1965 | Heerklotz | 99—44 (MISC) |
| 3,236,166 | 2/1966 | Steisslinger et al. | 95—10 C |
| 3,352,220 | 11/1967 | Lang et al. | 95—10 C |
| 3,464,333 | 9/1969 | Koichi Aoki et al. | 95—10 C |
| 3,496,849 | 2/1970 | Winkler et al. | 95—11.5 X |
| 3,498,192 | 3/1970 | Tadashi Ito et al. | 95—11.5 X |

FOREIGN PATENTS

| | | | |
|---|---|---|---|
| 1,138,625 | 10/1962 | Germany | 95—44 |

SAMUEL S. MATTHEWS, Primary Examiner
R. P. GREINER, Assistant Examiner

U.S. Cl. X.R.
95—10 C, 11 L